July 8, 1924.
H. N. ANDERSON
DIE FOR ROLLING GEARS
Filed July 26, 1920     2 Sheets-Sheet 1
1,500,567
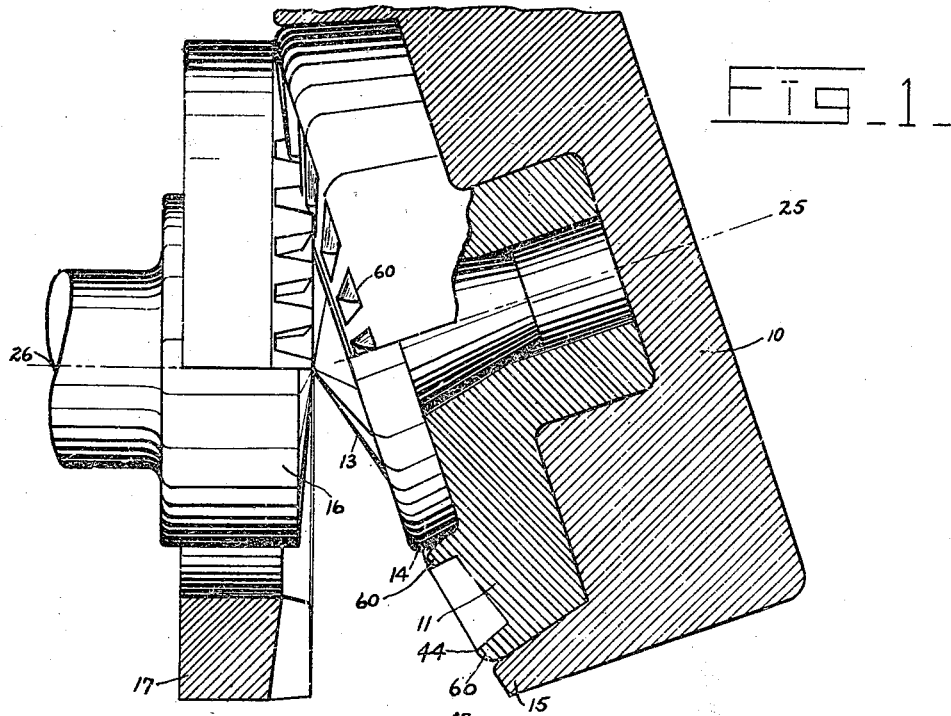
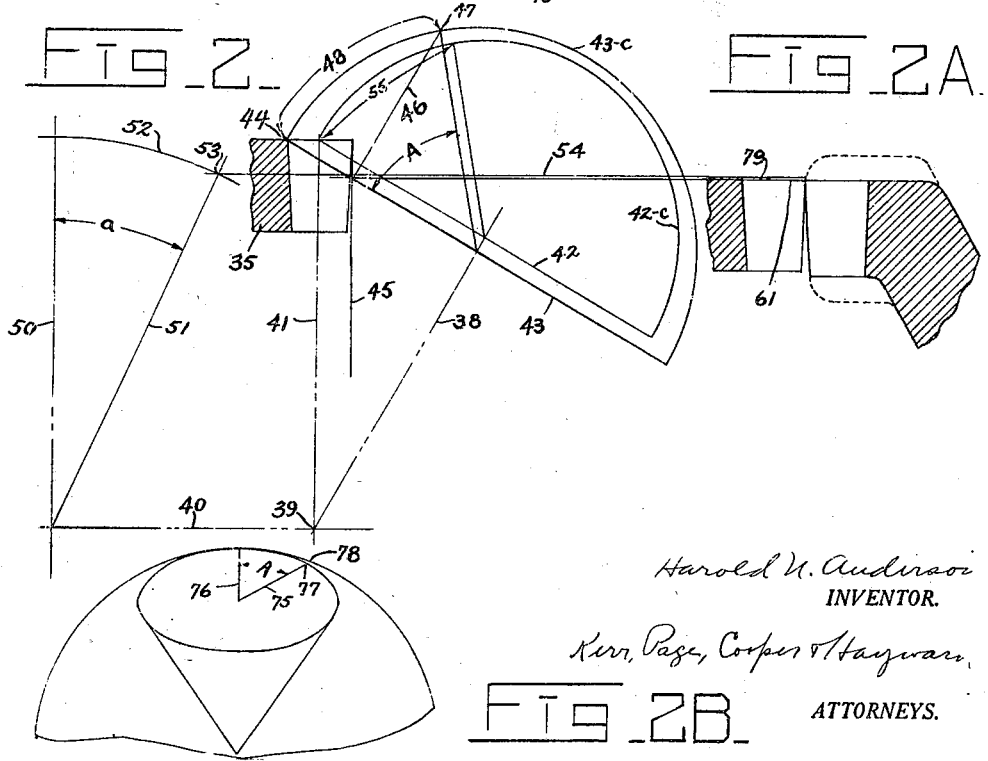
Harold N. Anderson
INVENTOR.
Kerr, Page, Cooper & Hayward,
ATTORNEYS.

July 8, 1924.
H. N. ANDERSON
DIE FOR ROLLING GEARS
Filed July 26, 1920  2 Sheets-Sheet 2
1,500,567
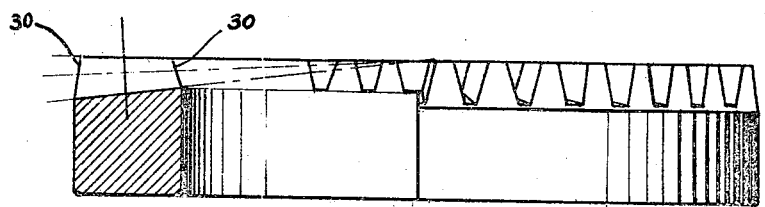
Fig_3_
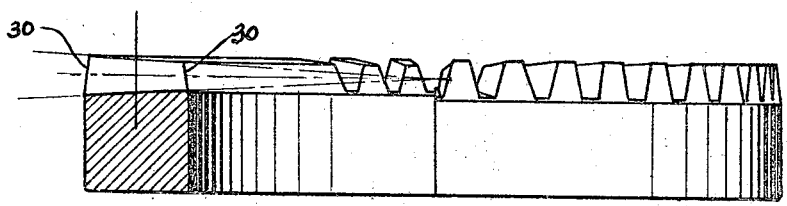
Fig_4_
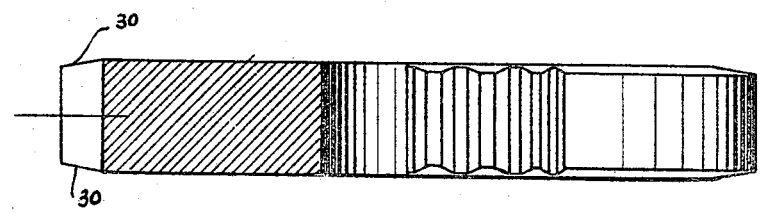
Fig_5_
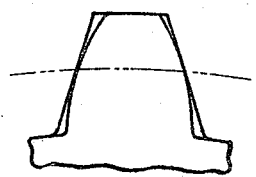
Fig_6_
INVENTOR.
Harold N. Anderson,
BY
Kerr, Page, Cooper & Hayward
ATTORNEYS.

Patented July 8, 1924.

1,500,567

UNITED STATES PATENT OFFICE.

HAROLD NAPIER ANDERSON, OF CLEVELAND, OHIO.

DIE FOR ROLLING GEARS.

Application filed July 26, 1920. Serial No. 399,043.

*To all whom it may concern:*

Be it known that I, HAROLD N. ANDERSON, a citizen of the United States, residing at Cleveland, in the county of Cuyahoga and State of Ohio, have invented certain new and useful Improvements in Dies for Rolling Gears, of which the following is a full, clear, and exact description.

My present invention relates to improvements in die rolls for forming teeth on gears by rolling a die and a heated gear blank together. This method of making gears is shown in several U. S. patents that have been issued to me, which I will refer to later.

The art of rolling teeth on gears is based on the principle that since two gears having properly constructed teeth are adapted to roll together at a definite velocity ratio, it follows that if one such gear is rolled in contact with a plastic or malleable blank, while a required velocity ratio is maintained between the gear and blank, the teeth of the gear will form teeth on the blank such as will enable the blank later to function properly with any other gear having teeth of the correct size and shape. My various gear rolling machines are therefore devices whereby to roll a finished gear, which I call a die, or die roll, against heated blanks, meanwhile maintaining proper velocity ratio between the die and blank. Before proceeding to describe my present invention I wish to point out certain characteristics pertaining to gear teeth. While there are several known systems of toothed gearing, only involute gears will be considered in the present application.

The teeth of a rotary involute gear are constructed on what is known as a base circle, and the faces of the teeth have the form of an involute evolved from said circle. The teeth therefore have more or less curvature according to the number of teeth in the gear; the teeth of a 15 tooth involute gear have a very pronounced curvature, while in a 150 tooth gear the curvature is but slight. In a 300 tooth gear the curvature is almost nil. There is another type of involute gear, called a rack, in which the teeth are constructed on a plane instead of a circle, and the faces of the teeth have no curvature whatever. The rack is a sequel of the fact that the larger the number of teeth in a gear, the larger will be its base circle, and that the nearer the base circle approaches a straight line the straighter are the faces of the teeth. In fact, a rack is often likened to a gear having an infinite number of teeth formed on a base circle of infinite radius.

In my Patent No. 1,001,799 I showed a machine for rolling gears, in which the die was substantially a rotary spur gear; in my Patent No. 1,240,918 the die is substantially a bevel gear. In each of these machines, therefore, according to the foregoing explanation, the faces of the die teeth are curved. In Patent No. 1,240,913 I showed a machine for rolling gears, in which the die was a rack, the teeth of the die therefore having flat faces. In Patent No. 1,250,916 I showed a machine for rolling bevel gears, in which the die roll was a crown gear. A crown gear is called a circular rack and its teeth have flat faces. Theoretically, the teeth of an involute crown gear are not absolutely flat, but since their curvature is so slight as almost to defy detection it is universally regarded as negligible and the teeth are always formed with flat faces.

In forming gear teeth by my rolling process the teeth are in fact generated. Rolling the toothed die against the blank while maintaining between the die and blank a fixed velocity ratio, results in forming teeth on the blank whose contour is conjugate to that of the die. If the die teeth have a true involute form the teeth generated by them on the blank will have the form of a true involute. But it is possible to modify the form of the resulting gear tooth by making the necessary modifications in the die. And this is one of the objects of my present invention.

Another object is to simplify the making of die rolls for rolling bevel gears; and another to facilitate the up-keep of the dies.

Another object is to eliminate certain strains on the dies, and also the rolling machines during the process of rolling gears.

Other objects, and certain advantages obtained by my invention, will be pointed out later.

In the accompanying drawings,

Fig. 1 is an assemblage of one of my new dies and parts with which it is closely associated.

Fig. 2 is a diagram for the purpose of showing the action of die roll teeth as they roll into and out of the blank.

Figs. 2$^A$ and 2$^B$ are diagrammatic views supplementing Fig. 2.

Fig. 3 is a side view, partly in section, of my new die for rolling bevel gears.

Fig. 4 is a similar view of a crown die.

Fig. 5 is a face view, partly in section, of a die roll for spur gears.

Fig. 6 is a fragmental view showing the relative shapes of two different kinds of gear teeth.

Referring now to Fig. 1, the numeral 10 designates a holder in which is carried a bevel gear blank 11. The rolling of teeth on the blank has been completed but the die roll is still in position with its teeth embedded in the blank. The blank is held in the holder by a circular block 13, which serves not only this purpose but also it serves as a shroud to limit the lateral flow of metal as the teeth are formed. The portion of the block that acts as a shroud is seen at 14. The holder 10 has an annular extension 15 that acts as a shroud to limit the lateral flow of metal at the outside of the blank. The block 13 has a conical face which preferably, though not necessarily, coincides with the pitch cone of the finished blank; and this block is pressed into the blank by a block 16 having a conical face coinciding with the pitch cone of the die roll 17. The parts so far described are shown, together with the manner in which they are supported and operated, in my Patent No. 1,240,916 previously referred to. It will be sufficient, therefore, at this time to say that the holder 10 is mounted on a shaft which rotates on an axis indicated by the center line 25 and the die 17 is mounted to rotate on an axis indicated by the center line 26, while the holder and die are compelled to maintain a fixed speed ratio by timing gears not shown. In addition to its rotary motion the die is arranged to move to and fro with reference to the blank in directions parallel to axis 26, this movement being effected without interfering with the rotary motion of the parts. Provision is also made for moving the block 16 for clamping the blank in the holder. While the heated blank is being inserted in the holder the block 16 and die 17 are withdrawn a suitable distance, and after the blank is in place the block 13 is inserted in the blank and the block 16 brought up into contact with it. The die and holder are then started to rotating and the die advances toward the blank until its teeth have sunk to the required depth in the metal, thus generating teeth on the blank.

It is to be understood that the foregoing description is only for the purpose of rendering the succeeding description of my invention easily understood, but that it is by no means the only or even preferred arrangement that may be employed. It is used here because of its simplicity.

In my Patent No. 1,240,916 the die roll illustrated and described is a conventional crown gear, its teeth being constructed on a pitch plane and having flat faces, like the teeth of a rack. Fig. 4 of the present application illustrates this kind of a die roll. Fig. 3 illustrates my improved die roll for rolling bevel gears, and it differs from Fig. 4 in that its teeth are constructed on a cone of low altitude, instead of a plane. But the teeth have flat faces, the same as those of Fig. 4.

According to the theory of involute gears, the faces of the teeth in the die shown in Fig. 3 should be slightly curved. But since the faces of the teeth in this die are flat, it follows that teeth generated with the die will not conform strictly to the involute principle. Beginning at the pitch line, where they will be of the correct thickness, the generated teeth will be relieved; that is, slightly thinner, both above and below the pitch line than they would be were they generated with a die having true involute teeth. And this modification of the generated teeth will be equal to the prominence of the faces of the die teeth. This can be better understood by reference to Fig. 6, where a tooth having curved faces is superposed on a tooth having flat faces, both teeth having the same pitch line thickness. This illustrates, exaggeratedly, the difference between the teeth of the die shown in Fig. 3 and what the shape of the teeth would be if they were truly involute. Since the teeth generated on the blank are conjugate to the die teeth, teeth generated with the die shown in Figure 3 will be as much thinner than true involute teeth, above and below the pitch line, as the faces of the die teeth are more prominent than those of true involute teeth. In other words, the relief of the generated teeth is complementary to the prominence of the faces of the die teeth.

Gears generated with a die such as that shown in Fig. 3, i. e. a slightly conical die with flat faced teeth, possess the property of running with extraordinary smoothness and noiselessness. When in operation the teeth of gears roll into and out of mesh successively, and there is a point at which each tooth must come into contact with a tooth of the mating gear. Where the teeth are true involutes the pressure between the teeth is as great at the beginning of their engagement as at any other time, and it naturally follows that the teeth come together with considerable impact. Rolling the teeth with a slightly conical die having flat faced teeth, relieves the teeth of the gear slightly at their addenda and dedenda and teeth of this kind come into engagement without the impact referred to. Their first contact is very light and the pressure then becomes gradually greater until it reaches its maximum. Naturally the separation of the teeth is also without shock.

The crown gear type of die for rolling bevel gears has a very decided advantage over the conical type of roll, in that it is very much easier to make dies having flat than curved faced teeth. Since the die of low altitude shown in Fig. 3 has flat faced teeth, it is seen that the advantages of the crown type of die are retained in this new die.

I have mentioned the ease with which dies having flat faced teeth can be made; closely related to this is the matter of up-keep of the dies. In Figs. 3 and 4 it is seen that the die is simply a ring with teeth on its end. After the dies are made and the teeth cut on them they are hardened. Then they are set up in a grinding machine, ground to size and the teeth ground true. The up-keep of the dies is simply a matter of regrinding the teeth from time to time as they wear, which can be continued until the ring becomes too thin to stand the strain they undergo in rolling the gears. While the dies are in operation a stream of water is played on them, which keeps them from getting hot enough to draw their temper. So it is never necessary to reharden the dies. In cutting and grinding the teeth an ordinary milling machine and dividing head may be used, as the cutting is done with flat faced cutters and the grinding with flat faced wheels.

The method of rolling gears shown in Fig. 1, wherein shrouds are employed to limit the lateral flow of metal during the tooth forming process, is the subject of U. S. Patent No. 1,377,177, granted to me May 10, 1921. This method involves the die teeth being repeatedly drawn out of and returned to pockets in the hot blank. In order to facilitate this and avoid unnecessary loss of energy I prefer to bevel the sides of the teeth, as at 30 in Figs. 3, 4 and 5. I call this giving the teeth "draught", and to a certain extent it is the same thing as is done with patterns for castings and with dies for drop forgings. There is the difference, however, that where draft is ordinarily provided merely to facilitate separating the work from the pattern, in the present case, in addition to saving power it facilitates the re-entrance of the die teeth into the blank and improves the action of the die generally. A crown die roll with the sides of its teeth beveled in the manner referred to is shown in my application Serial Number 318,862, for herring-bone gears.

Referring now to Fig. 2, a fragment of a crown die roll is shown at 35. This die is supposed to be enmeshed to the full depth in a bevel gear blank having just half as many teeth as itself. By full depth is meant that the die teeth extend clear to the bottom of the spaces between the blank teeth, while the blank teeth extend clear to the bottom of the spaces in the die. This is the condition which will obtain at the completion of the operation of rolling teeth. The axis of the blank is represented by the line 38, the point 39 being the apex of the pitch cone of the blank. The line 40, representing the axis of the die, passes through point 39. The line 41 represents both the pitch plane of the die and one side of the cone. The base of the cone is represented by line 42. Parallel to the line 42 is a line 43, which represents the orbit of the points of the blank teeth most remote from the axis of the blank; that portion of the teeth which is designated by the numeral 44 on Fig. 1. Lines 42 and 43 actually represent circles, so semi-circles 42$^c$ and 43$^c$ are drawn with lines 42 and 43, respectively, as diameters. A line 45, parallel to line 41, represents the orbit of the outer points of the die teeth. Now when the die and blank shown in Fig. 2 rotate, the points 44 of the blank teeth roll down into the spaces between the die teeth until they reach the point marked 44 on Fig. 2. The point 44 of any particular tooth of the blank reaches the point 44 in Fig. 2 at the moment the corresponding element of the pitch cone touches the pitch plane of the die, and I will call this the median line. If the line 45 is regarded as a plane, it is clear that the point 44 of the blank tooth enters the zone of the die as it crosses the plane. That is, the point 44 of the blank tooth enters the space between two teeth on the die as it crosses line 45. Since line 43 represents the orbit of this point 44, it is clear that the point 44 enters the zone of the die at the point where line 43 crosses line 45.

The line 46 is a perpendicular erected on line 43 at the point of intersection of lines 43 and 45, and meets the semi-circle 43$^c$ at 47. The arc 48 represents the angular movement of the blank from the moment the point 44 of any particular tooth crosses the plane 45 until said point reaches the median line. The angle of this arc is represented by A. The angular movement of the die during this same period is represented by angle $a$. This angle is formed by a line 50, drawn perpendicular to the axial line 40, and a line 51 drawn from the intersection of lines 40 and 50. With a radius equal to that of the die the arc 52 is drawn, and from the intersection 53 of this arc with line 51 a line 54 is drawn parallel to the axial line 40. Angle $a$ is to angle A as the diameter of the blank is to that of the die; in the present case, the diameter of the blank is one-half that of the die, so angle $a$ is one-half that of angle A. In all cases the length of arc 52 will equal an arc of circle $42^C$ having an angle equal to A. Such an arc has been laid off on circle $42^C$ and is designated by numeral 55. It is to be noted that line 54 does not pass through the intersection of lines 43 and 45. This will be considered presently.

From an examination of the blank in Fig. 1, it will be seen that the spaces between the teeth in the blank are pockets having four walls, which comes from the fact that the teeth on the blank are shrouded. Withdrawal of the die teeth from these pockets, and their return to the pockets, which occurs repeatedly during the rolling operation, is evidently much facilitated by the teeth being beveled at their sides. This would be true even if the die teeth registered perfectly with the pockets as they roll in contact with each other. But as a matter of fact they do not quite register. This is demonstrated by Figs. 2, $2^A$ and $2^B$. In Fig. 2 the line 54 does not pass through the intersection of lines 43 and 45. In Fig. $2^A$ a fragment of a crown gear is shown with its perimeter resting on line 54. Facing it is a fragment of a bevel gear having half as many teeth as the crown gear, the perimeter of this gear being placed on a line 61, representing the point of intersection of lines 43 and 45. The outer extremity of the blank tooth, i. e., the point 44 is in contact with the line 45. In other words the die and blank teeth are about to become enmeshed. In Fig. $2^B$ the pitch cone of the blank is shown lying on a fragment of the pitch plane of the die, the parts being seen on a line parallel to the axis of the die. A radial line 75 is drawn on the base of the cone, which with a radial line 76 coincident with the median line, or line of contact, forms an angle equal to angle A of Fig. 2. The point 77, at which the line 75 meets the perimeter of the cone, is somewhat inside of the perimeter of the die. In other words, if the pitch plane of the die were the bottom of a cylindrical vessel, and the cone lay in the bottom of the vessel with its base touching the side and its apex at the center of the vessel, the point 77 would be as far from the side of the vessel as the point 77 is from point 78 on Fig. $2^B$. Rolling the cone on the bottom of the vessel would presently bring the point 77 into contact with the side. Now if the cone had teeth on it, and there were teeth in the vessel in the same position with reference to its bottom that the teeth of a crown gear, bear to its pitch plane, the point 44 on one of the cone's teeth would be removed from the side of the vessel when the tooth coincided with point 78, and it would gradually approach the side as the cone rolled on the bottom, reaching the side of the vessel at the moment it coincided with the median line. This recession of the point 44 from the side of the vessel is what accounts for the line 54 not passing through the point of intersection of lines 43 and 45, in Fig. 2.

Now instead of considering the point 44 entering a space between two teeth of the die, consider a die tooth entering a pocket in the blank. If the outer end wall of the pocket were in the same radial position on the blank as point 44 on one of its teeth, it is evident that the die tooth could not enter the pocket. For example, suppose that in Fig. $2^A$ the wall of the pocket coincided with line 61; clearly the die tooth could not enter the pocket. But if the tooth were beveled along the dotted line 79, it could enter. The blank rotates a number of times while teeth are being rolled on it, and during this time the die and blank constantly approach each other, so that at each revolution of the blank the die teeth enter to a proportionately greater depth. The end walls of the pockets have an obliquity corresponding to the bevel of the die teeth, and at each entrance of the teeth into the blank they go to the depth they last reached before coming in contact with the end wall. From there and until the die teeth reach the median line they are not only sinking deeper into the blank, but they are pushing the end wall of the pocket outward. In practice, it is preferable to give the die teeth a bevel slightly greater than that indicated, so that as soon as the die teeth pass over the median line they will recede from the end wall of the pocket. With this draft on the die the teeth are not only rolled with much less strain on the apparatus but the resulting teeth are better.

The recession of the blank, as above described, is most pronounced when a crown die is used. This is because it is the curvature of the blank only that acts to separate the die and blank. Where the die is conical its own curvature also contributes to the separation of its teeth from those of the blank, with the result that the separation is effected with less angular movement of the die and blank. It will be evident from a study of Figs. 2 and 2$^B$, especially the latter, that a reduction of angular movement required for the enmeshment and separation of the die and blank teeth will result in a more than proportional reduction in the distance the blank teeth will recede in leaving the die. It will also be evident that with a conical die the recession will become less as a result of the die and blank becoming more nearly equal in diameter; in fact, there will be no recession where the die and blank are of the same size.

The desirable results already described, as obtainable with a conical die roll of low altitude and flat faced teeth, may also be obtained in rolling spur gears. I have already mentioned the extremely slight curvature of the tooth faces of gears having a large number of teeth. So in order to get any desired degree of relief on the teeth of spur gears I need only make my die roll of a definite diameter and make the faces of the teeth flat. For example, making the die with 150 teeth will produce a certan degree of relief on the teeth of the gears rolled with that die. With more teeth in the die the relief will be less, with fewer teeth the relief will be more. So by selection of the number of teeth in the die I am able to roll spur gears with any desired degree of relief on the teeth. In Fig. 5 I show a die, partly in section, for rolling spur gears. It shows straight sided teeth with their sides beveled. In order to bring out these details more clearly the teeth are made large, with consequent reduction in the number of teeth. However, since the number of teeth depends on the diameter of the die it is evident that the die can be made any size that is wanted.

It is not to be understood that I limit the practical application of my invention to the particular form shown, as it may be embodied in other forms as well.

What I claim is as follows:

1. A die for rolling teeth on gears, having flat faced teeth formed on a curved base.

2. A die for rolling teeth on bevel gears, having flat faced teeth formed on a conical base.

3. A die for rolling teeth on gears, having flat faced teeth formed on a curved base, the sides of said teeth being beveled to give them draught.

4. A die for rolling teeth on bevel gears, having flat faced teeth formed on a conical base, the sides of the teeth being beveled to give them draught.

5. A die for rolling teeth on gears, having teeth whose sides are beveled to give them draught.

6. A die for rolling teeth on shrouded gears, having teeth whose sides are beveled sufficiently to prevent the die teeth overlapping the shrouds as they enter the pockets in the blank.

7. A die for rolling teeth on bevel gears, consisting of a cylindrical ring with teeth formed on its end, the sides of said teeth being beveled.

8. A die for rolling teeth on bevel gears, consisting of a cylindrical ring with teeth cut on its end, said ring being of sufficient length to permit of the teeth being reground from time to time as they become worn.

9. For use in a machine for generating teeth on gears, wherein a tooth-generating tool and a gear blank are given such relative movement as is maintained by a couple of gears rotating with their teeth enmeshed, the blank representing one gear and the tool the other; a tool of that character adapted to generate teeth on a blank according to a given system of tooth construction, said tool conforming to the given system, except that from the point which operates at the pitch line of the blank said tool becomes gradually more prominent than it would be if in strict accordance with said system, to the end that the teeth it generates on the blank will become gradually thinner, beginning at the pitch line of the blank, than they would be were the teeth formed strictly according to said system.

10. For use in a machine for generating teeth on gears, wherein a tooth-generating tool and a gear blank are given such relative movement as is maintained by a couple of gears rotating with their teeth enmeshed, the blank representing one gear and the tool the other; a tool of that character adapted to generate teeth on a blank according to the involute system of tooth construction, said tool conforming to the involute system, except that from the point which operates at the pitch line of the blank said tool becomes gradually more prominent than it would be if in strict accordance with said system, to the end that the teeth it generates on the blank will become gradually thinner, beginning at the pitch line of the blank, than they would were the tooth faces true involutes.

11. For use in a machine for generating teeth on bevel gears, wherein a tooth-generating tool and a gear blank are given such relative movement as is maintained by a couple of bevel gears rotating with their teeth enmeshed, the blank representing one gear and the tool the other; a tool of that character adapted to generate teeth on a bevel gear blank according to a given system of tooth construction, said tool conforming to the given system, except that from the point which operates at the pitch line of the blank said tool becomes gradually more prominent than it would be if in strict accordance with said system, to the end that the teeth it generates on the blank will become gradually thinner, beginning at the pitch line of the blank, than they would be were the teeth formed strictly according to said system.

12. For use in a machine wherein a toothed die is rolled against a heated blank while a fixed velocity ratio is maintained between the die and blank; a die having teeth according to a given system of gear-tooth construction, except that from the pitch line of the die the teeth gradually become thicker than they would be were they in strict accordance with said given system of tooth construction, to the end that the teeth rolled on the blank will become gradually thinner, beginning at the pitch line of the blank, than they would be were the teeth in strict accordance with said system of tooth construction.

In testimony whereof I affix my signature in the presence of two subscribing witnesses.

HAROLD N. ANDERSON.

Witnesses:
  SILEY J. BAKER,
  T. F. LEWIS.